United States Patent [19]
Basuthakur et al.

[11] Patent Number: 5,954,298
[45] Date of Patent: Sep. 21, 1999

[54] ACTIVE SPACECRAFT THERMAL CONTROL SYSTEM AND METHOD

[75] Inventors: Sibnath Basuthakur, Phoenix; Robert David Allen, Tempe, both of Ariz.; Daniel David Miller, Superior, Colo.

[73] Assignee: Motorola, Inc., Schaumburg, Ill.

[21] Appl. No.: 08/842,106

[22] Filed: Apr. 28, 1997

[51] Int. Cl.⁶ ................................................... B64G 1/58
[52] U.S. Cl. ........................................... 244/163; 165/41
[58] Field of Search ............................... 244/158 R, 163, 244/172; 165/41, 104.12, 104.14, 104.21, 104.23, 104.31, 904

[56] References Cited

U.S. PATENT DOCUMENTS

| | | | |
|---|---|---|---|
| 5,005,787 | 4/1991 | Cullingford | 244/163 |
| 5,135,184 | 8/1992 | Billig | 244/53 R |
| 5,236,152 | 8/1993 | Lander et al. | 244/117 A |
| 5,251,852 | 10/1993 | Pulkowski et al. | 244/172 |
| 5,267,605 | 12/1993 | Doty et al. | 244/163 |
| 5,305,973 | 4/1994 | Shortland et al. | 244/117 A |
| 5,419,156 | 5/1995 | Sywulka | 244/163 |

FOREIGN PATENT DOCUMENTS 8702098  9/1986  WIPO.

*Primary Examiner*—Galen L. Barefoot
*Attorney, Agent, or Firm*—Sherry J. Whitney; Frank J. Bogacz

[57] ABSTRACT

A spacecraft (10) has combined propulsion and active thermal control systems. A propellant storage tank (20) couples to a pressurant storage tank (18). A working fluid (52) resides in the pressurant storage tank (18) and propels propellant when needed while concurrently acting as a thermal working fluid. The working fluid (52) is expanded then routed to selected cooled components (64). After passing by the cooled components (64), the working fluid (52) is compressed and passed by selected heated components (82). A controller (36) monitors temperature sensors (88) and controls valve assemblies (60, 78) to determine the components (64, 82) to which the working fluid (52) is routed.

15 Claims, 2 Drawing Sheets

ACTIVE SPACECRAFT THERMAL CONTROL SYSTEM AND METHOD

FIELD OF THE INVENTION

The present invention relates generally to the field of spacecraft thermal control. More specifically, the present invention pertains to the use of propulsion system pressurant to actively control spacecraft thermal loads.

BACKGROUND OF THE INVENTION

Spacecraft thermal control is an important issue for the design and operation of a spacecraft. The deployment cost of a spacecraft depends significantly on the spacecraft weight and volume. Volume of a spacecraft depends largely on the amount of heat that needs to be dissipated by the available surface area of the spacecraft. Increasing the amount of heat that needs to be dissipated increases the spacecraft surface area needed for heat rejection. An increase in spacecraft surface area translates into increased spacecraft perimeter area and volume even though the volume may not be efficiently used. Increased spacecraft volume leads to increased spacecraft costs.

Spacecraft thermal loading occurs due to equipment dissipation and external loads from the earth and sun. Prior art thermal control systems rely on passive thermal control to relieve spacecraft thermal loads. One such system uses surface radiators which must be located on an external surface of the spacecraft. This greatly reduces the amount of prime external surface area available for payload components requiring external surface mounting. Another passive thermal control system uses a deployable heat pipe system for dissipating thermal loads. This system can only dissipate thermal loads through radiation and requires a deployment mechanism which adds weight and complexity to the spacecraft.

For conventional passive thermal control systems, a surface's ability to reject heat to space and maintain temperatures below some limit is determined by the worst case external load on that surface. This means that excess surface area is required to handle maximum thermal loads which may exist only for a short time or during a specific season.

Spacecraft battery life often determines the useful life of a spacecraft. One of the most frequent causes for spacecraft battery failure is thermal cycling. For this reason, conventional spacecraft typically have batteries located adjacent to external panels of the spacecraft on zenith or north/south surfaces and the batteries are thermally controlled with separate thermal blankets, radiators, and heaters to thermally isolate the batteries from the remainder of the spacecraft. This not only consumes prime external panel area but also unnecessarily increases spacecraft weight.

Spacecraft thermal control systems also include heaters for various components. In order to maintain thermal balance of payload components, replacement heaters are turned on when payload power is off. In addition thermostatic controlled heaters are placed on various propulsion system valves and other components to prevent temperatures from getting too cold.

Thus, the issue of thermal control of a spacecraft has not been completely resolved. Conventional thermal control systems increase spacecraft weight and require an undesirably large amount of prime external surface area for heat dissipation. Moreover, conventional systems use electrical heaters to heat various components thus reducing the amount of available electrical power to operate payload components.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Preferred embodiments of the present invention are herein described in the context of a space based communication satellite/spacecraft in orbit about the earth. However, the invention can be applied to spacecraft orbiting other celestial bodies and to spacecraft traveling between celestial bodies.

Figure 1:
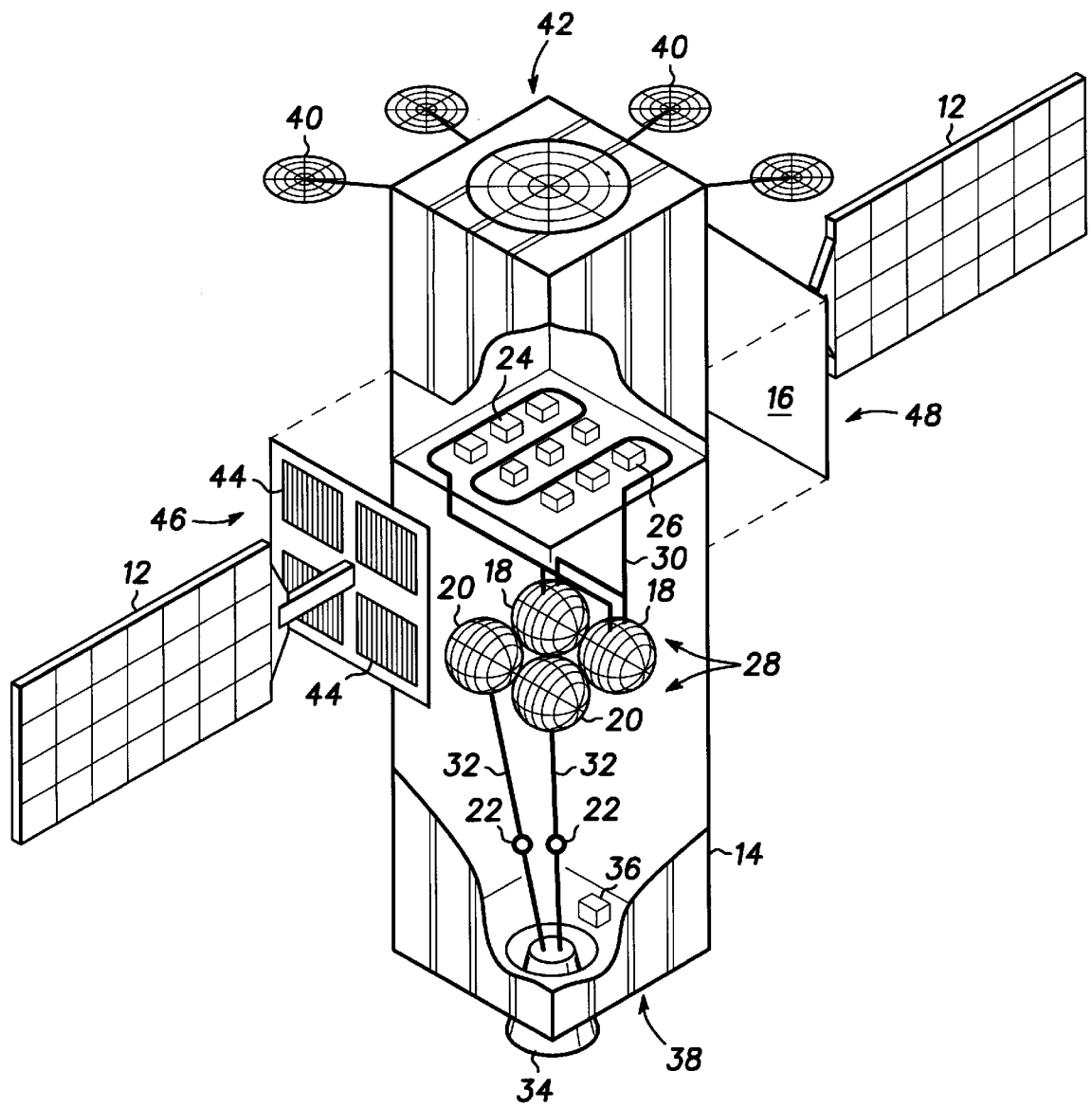
FIG. 1 shows an exploded view of a spacecraft configured in accordance with a preferred embodiment of the present invention.

FIG. 1 shows an exploded view of a representative spacecraft 10 configured in accordance with a preferred embodiment of the present invention. Spacecraft 10 has symmetric north and south solar panels 12 that generate electrical power when solar energy is available.

Spacecraft 10 also includes a body 14. Body 14 has an external surface 16 and holds storage tanks 18 for propulsion system pressurant and storage tanks 20 for propulsion system propellant. Propellant valves 22, batteries 24, and power amplifiers 26 are all located inside body 14. Body 14 also holds a conduit system 28 which includes a thermal conduit system 30 and a propellant conduit system 32. In a preferred embodiment, orientation of spacecraft 10 is such that a thruster 34 and a controller 36 are located on a zenith side 38 of spacecraft 10, communication antennas 40 are located on a nadir side 42, and thermal radiator panels 44 are located on a south side 46. It should be noted that when spacecraft 10 is deployed and so orientated, south side 46, zenith side 38, and a north side 48 tend to be colder than other sides of the spacecraft 10.

FIG. 1 depicts only an exemplary representation of spacecraft 10. Many diverse configurations for spacecraft 10 are possible within the scope of the present invention. In general, spacecraft 10 includes a combined propulsion and active thermal control system that uses a working fluid for both propulsion and thermal control functions. In accordance with the thermal control function, the working fluid minimizes component thermal cycling.

An active thermal control system differs from a passive thermal control system in that the thermal working fluid of an active control system is pressured or pumped through the system while a passive control system does not act on the thermal working fluid and uses heating and cooling of the thermal working fluid to move it through the system. Component thermal cycling occurs when a component experiences temperature variations. Thermal cycling is a common cause of battery and other component failures. Thermal cycling is reduced by equalizing component temperatures. Those skilled in the art will appreciate that components with equalized temperatures experience limited temperature variation. Nothing requires all temperature variations to be eliminated.

To equalize component temperatures the present invention combines a propulsion system with an active thermal control system. Conduit system 28 uses a working fluid which is common to both thermal conduit system 30 and propellant conduit system 32. This working fluid may be a propellant, a propellant pressurant, or some other fluid. The use of a common working fluid for both thermal control and propellant functions reduces spacecraft weight and complexity because separate fluids and storage tanks need not be dedicated to the diverse functions.

The embodiment shown in FIG. 1 is a bi-propellant propulsion system having two storable hypergolic propellants (such as monomethyl hydrazine and nitrogen tetroxide) that are flow regulated by propellant valves 22 and are consumed by thruster 34 when the propulsion system is operating. Each propulsion system propellant storage tank 20 couples to propulsion system pressurant storage tank 18. A conventional inert pressurant fluid such as helium or nitrogen can be used. Although the present invention will be discussed in terms of a bi-propellant system, the present invention can also be configured to work with a monopropellant system.

For one preferred embodiment of the present invention, propellant conduit system 32 and thermal conduit system 30 share the propulsion system pressurant as a common working fluid. For propellant conduit system 32, the pressurant forces the two propellants out of their respective storage tanks 20, through propellant valves 22 and into thruster 34 for spacecraft 10 station keeping and attitude adjustment. For the thermal conduit system 30, the propulsion system pressurant acts as a thermal conductor to transfer heat between spacecraft components to equalize component temperatures and reduce component thermal cycling.

The present invention distributes spacecraft thermal loads by configuring thermal conduit system 30 so as to route the pressurant or common working fluid, proximate to surfaces or sides of temperature sensitive components. Temperature sensitive components are components of spacecraft 10 which are required to dissipate or absorb heat from time to time throughout the spacecraft mission to prevent the component from becoming too hot or too cold, respectively. Batteries 24 and power amplifiers 26 represent temperature sensitive components which often require cooling in spacecraft missions. Power amplifiers 26 can include conventional components such as traveling wave tube amplifiers (TWTA) and solid state power amplifiers (SSPA). Propellant valves 22 and thermal radiator panels 44 represent temperature sensitive components which often require heating in spacecraft missions. Propellant valves 22 are desirably temperature controlled to remain operational since they regulate propellant flow into thruster 34.

Nothing requires temperature sensitive components to be only heated or cooled. For example, during some periods of spacecraft operation, power amplifiers 26 may require heating when they are not energized and generating their own heat. Likewise, batteries 24 may desirably be heated and cooled as needed to keep temperature cycling to a minimum.

As discussed in more detail below, conduit system 28 and the components coupled thereto are configured to heat and/or cool various spacecraft 10 components, thereby distributing thermal loads. The configuration of conduit system 28 and the components coupled thereto is accomplished by controller 36. The way in which controller 36 changes thermal conduit configurations is discussed below.

In addition, thermal conduit system 30 couples to thermal radiator panel 44. For the sake of clarity, FIG. 1 does not show this coupling, however this configuration is shown schematically in FIG. 2. Thus, thermal conduit system 30 not only distributes spacecraft thermal loads but also transfers excess thermal heat to space. This embodiment actively moves thermal energy from components inside spacecraft 10 or on its external surface 16 to thermal radiator panel 44 for thermal rejection to space. Although not shown, another thermal absorbing panel may be located on a normally hotter surface of spacecraft 10 and coupled to thermal conduit system 30 to aid heating in unusual situations where the components of spacecraft 10 may not generate sufficient heat to maintain thermally sensitive components within a desirable temperature range.

Conventional spacecraft practices locate thermally sensitive components, such as batteries and power amplifiers, on cooler spacecraft external surfaces to keep operating temperatures down within acceptable limits. However, this conventional practice consumes prime external surface area and leads to a larger spacecraft. In contrast, a preferred embodiment of the present invention positions batteries 24 and power amplifiers 26 inside spacecraft 10, distally located from cooler external sides 48, 46, and 38. Thus, prime external surface area becomes available for other functions. Alternatively, the relocation of the thermally sensitive components to locations distally positioned from prime external surfaces allows the spacecraft perimeter and volume to be reduced accordingly, along with spacecraft deployment costs.

Figure 2:
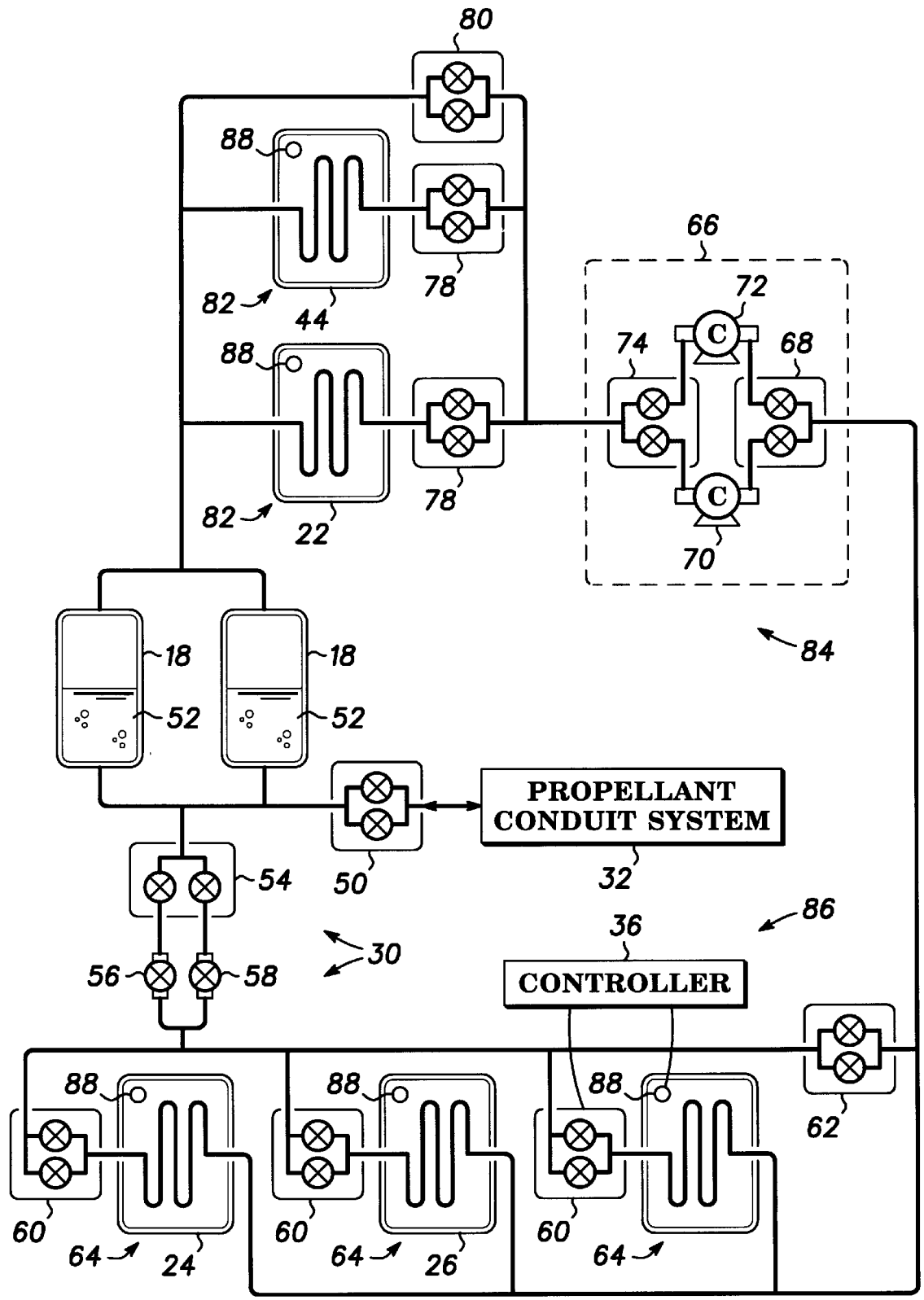
FIG. 2 shows a block diagram of a combined spacecraft propulsion and active thermal control system in accordance with a preferred embodiment of the present invention.

FIG. 2 shows a block diagram of a combined spacecraft propulsion and active thermal control system in accordance with a preferred embodiment of the present invention. FIG. 2 illustrates that conduit system 28 includes thermal conduit system 30 coupled to propellant conduit system 32 through a valve assembly 50.

In connection with thermal conduit system 30, propellant pressurant tanks 18 hold a working fluid 52 which serves the needs of both thermal and propulsion systems of spacecraft 10. Examples of suitable fluids are Helium, Nitrogen, and Freon, but other fluids, including propellant, may be used as the working fluid.

Outlets of propellant pressurant tanks 18 couple to inlets of a regulator valve assembly 54. Outlets of valve assembly 54 couple in parallel to inlets of a first expansion valve 56 and a second expansion valve 58. Outlets of first expansion valve 56 and second expansion valve 58 couple through conduit system 30 to inlets of any number (three shown) of regulator valve assemblies 60 and to an inlet of a bypass regulator valve assembly 62. Outlets of valve assemblies 60 couple to inlets of various cooled components 64. Outlets of cooled components 64 couple to an outlet of bypass regulator valve assembly 62 and to an inlet of a pump 66.

Pump 66 includes a first valve assembly 68, first and second compressors 70 and 72, respectively, and a second valve assembly 74. Inlets of first valve assembly 68 serve as an inlet for pump 66. A first outlet of valve assembly 68 couples to an inlet of first compressor 70, and a second outlet of valve assembly 68 couples to an inlet of second compressor 72.

Outlets of compressors 70 and 72 respectively couple to first and second inlets of second valve assembly 74. Outlets of second valve assembly 74 serve as an outlet for pump 66.

The outlet of pump 66 couples to inlets of any number (two shown) of valve assemblies 78 and to an inlet of a bypass regulator valve assembly 80. Outlets of valve assemblies 78 couple to inlets of various heated components 82. Outlets of heated components 82 couple to an outlet of bypass regulator valve assembly 80 and to inlets of propellant pressurant tanks 18.

Thermal conduit system 30 may be routed directly to and through components 64 and 82, or system 30 may be routed to and through panels (not shown) to which or near which components 64 and 82 are mounted.

Thermal conduit system 30 has a heating side 84 and a cooling side 86. Cooling side 86 extends from expansion valves 56 and 58 to pump 66, and heating side 84 extends from pump 66 to pressurant tanks 18. Accordingly, cooling side 86 includes cooled components 64, and heating side 84 includes heated components 82. As discussed above, cooled components 64 and heated components 82 represent temperature sensitive components of spacecraft 10. Any temperature sensitive component may reside in either of heating side 84 or cooling side 86 of thermal conduit system 30. Moreover, the same component may be both a heated component 82 and a cooled component 64.

Examples of cooled components 64 include batteries 24 and power amplifiers 26. Examples of heated components 82 include propulsion system propellant valves 22 and thermal radiator panels 44. However, batteries 24, for example, may concurrently be both a cooled component 64 and a heated component 82. In addition, each cooled and heated component 64 and 82 represents either an individual temperature sensitive component or a plurality of temperature sensitive components coupled in series within conduit system 28.

Temperature sensors 88 are located proximate components 64 and 82 throughout spacecraft 10. Each of sensors 88 electrically couples to an input of controller 36, although FIG. 2 illustrates only one of such couplings for clarity. In addition, controller 36 has control outputs which electrically couple to each of valve assemblies 50, 54, 60, 62, 68, 74, 78, and 80, although FIG. 2 illustrates only one of such couplings for clarity.

In the preferred embodiment, valve assemblies 50, 54, 60, 62, 68, 74, 78, and 80, are redundant valve assemblies in which at least two valves are coupled in parallel. Each of the at least two valves can be separately controlled by controller 36. In addition, pump 66 provides a redundant compressor assembly, and redundant expansion valves 56 and 58 are provided in the preferred embodiment depicted in FIG. 2. The use, control, and benefits of redundant valve assemblies and other components for backup purposes and for improved system reliability is well known to those skilled in the art.

In general, cooled components 64 are selectively cooled by appropriately controlling valve assemblies 60 and heated components 82 are selectively heated by appropriately controlling valve assemblies 78. Valve assemblies 60 and 78 are selectively controlled by controller 36 in response to temperature readings determined by sensors 88.

In particular, working fluid 52 is expanded through first expansion valve 56 and/or second expansion valve 58. The now much cooler working fluid 52 passes through thermal conduit 30 where its precise path is determined by the opened or closed positions of valve assemblies 60. Regulator valve position is determined and controlled by controller 36. When sensors 88 indicate that temperatures for components 64 are rising above predetermined maximum allowable temperatures, respective valve assemblies 60 are opened.

When valve assemblies 60 are opened, working fluid 52 flows through thermal conduit 30 to cooled components 64, absorbing heat as it flows by or through cooled components 64. Valve assemblies 60 remain open until cooled component 64 temperatures fall below predetermined thresholds.

After circulating through selected cooled components 64, working fluid 52 is routed to pump 66. After compression at pump 66, the temperature of working fluid 52 rises and can now be used to warm selected heated components 82. At this point in thermal conduit system 30, the precise path of working fluid 52 is determined by the opened or closed positions of valve assemblies 78. Regulator valve position is again determined and controlled by controller 36. When sensors 88 indicate that temperatures for components 82 are falling below predetermined minimum allowable temperatures, respective valve assemblies 78 are opened. When valve assemblies 78 are opened, working fluid 52 flows through thermal conduit 30 to heated components 82, releasing heat as it flows by or through heated components 82. Valve assemblies 78 remain open until heated component 82 temperatures rise above predetermined thresholds. From here thermal conduit 30 routes working fluid 52 back to pressurant accumulator/storage tank 18.

Under the active control of controller 36, selected temperature sensitive components 64 and 82 are cooled and heated, respectively, while working fluid 52 bypasses other selected components 64 and 82. Allowing the thermal control system to bypass individual components increases the efficiency of the thermal control system and the number of possible thermal configurations.

As discussed above, propellant pressurant serves as a desirable working fluid 52. Spacecraft designs assure an adequate supply of propellant pressurant, no matter how little propellant remains in the propellant tanks, and the active thermal control use consumes no propellant pressurant. Accordingly, an adequate supply of pressurant remains available for both the thermal control and propulsion needs of spacecraft 10 throughout the spacecraft mission.

Thermal conduit system 30 adds weight to spacecraft 10 to accommodate pump 66, valves 54, 60, 62, 68, 74, 78, and 80, and the plumbing associated with conduit system 30. In addition, spacecraft 10 consumes additional power primarily in operating pump 66. However, this added weight and power is offset, at least in part, by components, such as deployable heat pipes and related deployment mechanisms, separate thermal working fluids, battery compartment isolation materials, and the like, and power consumption, e.g. by electric heaters and the like, which are conventionally included in spacecraft but omitted in spacecraft 10.

In summary, the present invention combines a spacecraft active thermal control system and a propulsion system to distribute spacecraft thermal loads and reduce component thermal cycling. A propulsion system pressurant is used both to propel propulsion fluid toward thrusters and as a thermal working fluid which is expanded then warmed by absorbing heat from cooled components and compressed then cooled by dissipating heat at heated components.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A spacecraft having a combined propulsion and active thermal control system, said spacecraft comprising:
    a first component which includes a propellant valve;
    a second component which includes a battery, wherein said second component is active and temperature sensitive;
    a storage tank which contains a propulsion system fluid;
    a pump;
    a thruster;

7 a power amplifier; and a conduit system coupled to said tank, said pump, said first component, said second component, said thruster, and said power amplifier, said conduit system including said propulsion system fluid transferring heat between said first component and said second component, and so that heat generated by said battery and said power amplifier is transferred to said propellant valve.

2. A spacecraft as claimed in claim 1 wherein said propulsion system fluid is a propulsion system pressurant.

3. A spacecraft as claimed in claim 1 wherein:

said spacecraft additionally comprises a body having an external surface;

said second component comprises a battery; and said battery is distally located within said body from said external surface.

4. A spacecraft as claimed in claim 1 wherein:

said spacecraft additionally comprises a body having an external surface;

said second component comprises a power amplifier; and said power amplifier is distally located within said body from said external surface.

5. A spacecraft having a combined propulsion system and active thermal control system, said spacecraft comprising:

a plurality of active and temperature sensitive components, including a battery and a power amplifier;

a storage tank that contains a pressurizing fluid;

a storage tank that contains a propellant fluid, said storage tank being coupled to a propellant valve;

a pump;

a plurality of regulator valve assemblies;

an expansion valve;

a controller electrically coupled to said plurality of regulator valve assemblies; and a conduit system coupled to said pressurizing and propellant fluid storage tanks, said propellant valve, said pump, said plurality of regulating valve assemblies, said expansion valve, and said plurality of active and temperature sensitive components including said battery and said power amplifier, said conduit system including said pressurizing fluid transferring heat generated by said battery and said power amplifier is transferred to said propellant valve and between said plurality of active and temperature sensitive components in accordance with a configuration of said regulating valve assemblies defined by said controller.

6. A spacecraft as claimed in claim 5 wherein said pump comprises a compressor assembly.

7. A spacecraft as claimed in claim 6 wherein said compressor assembly comprises first and second redundant compressors.

8. A spacecraft as claimed in claim 7 wherein:

said expansion valve is a first expansion valve; and said spacecraft additionally comprises a second expansion valve, said first and second expansion valves being coupled in parallel for redundancy.

9. A spacecraft as claimed in claim 5 wherein at least a portion of said regulator valve assemblies each comprises first and second redundant regulator valves.

8

10. A spacecraft as claimed in claim 5 wherein:

said spacecraft additionally comprises a body having an external surface;

said plurality of active and temperature sensitive components include a battery; and said battery is distally located within said body from said external surface.

11. A spacecraft as claimed in claim 5 wherein:

said spacecraft additionally comprises a body having an external surface;

said plurality of active and temperature sensitive components include a power amplifier; and said power amplifier is distally located within said body from said external surface.

12. A spacecraft as claimed in claim 5 additionally comprising a plurality of temperature sensors located proximate said plurality of active and temperature sensitive components, said temperature sensors being electrically coupled to said controller.

13. A spacecraft having a combined propulsion system and active thermal control system, said spacecraft comprising:

a thermal radiator panel;

a plurality of active and temperature sensitive components including a battery and a power amplifier;

a storage tank that contains a pressurizing fluid;

a storage tank that contains a propellant fluid, coupled to a propellant valve;

a pump;

a plurality of regulator valve assemblies;

an expansion valve;

a controller electrically coupled to said plurality of regulator valve assemblies; and a conduit system coupled to said pressurizing and propellant fluid storage tanks, said propellant valve, said pump, said plurality of regulating valve assemblies, said plurality of active and temperature sensitive components including said battery and said power amplifier, and said thermal radiator panel such that said controller configures said conduit system so that said pressurizing fluid conveyed by said conduit transfers heat generated by said battery and said power amplifier is transferred to said propellant valve and transfers heat generated from said plurality of active and temperature sensitive components to said thermal radiator panel.

14. A spacecraft as claimed in claim 13 wherein:

said spacecraft additionally comprises a body having an external surface;

said plurality of active and temperature sensitive components include a battery; and said battery is distally located within said body from said external surface.

15. A spacecraft as claimed in claim 14 wherein:

said plurality of active and temperature sensitive components additionally include a power amplifier; and said power amplifier is distally located within said body from said external surface.

* * * * *